US011301458B2

(12) United States Patent
Kumar et al.

(10) Patent No.: US 11,301,458 B2
(45) Date of Patent: Apr. 12, 2022

(54) AUTOMATED CONTENT GENERATION

(71) Applicant: Microsoft Technology Licensing, LLC, Redmond, WA (US)

(72) Inventors: Pranish Atul Kumar, Sammamish, WA (US); Paul Adrian Foy, Redmond, WA (US); Paul Fraedrich Estes, Bellevue, WA (US); Jered D Aasheim, Eugene, OR (US); Tai Chou, Redmond, WA (US); David B Appel, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 144 days.

(21) Appl. No.: 16/206,644

(22) Filed: Nov. 30, 2018

(65) Prior Publication Data
US 2020/0174998 A1 Jun. 4, 2020

(51) Int. Cl.
G06F 16/23 (2019.01)
G06F 16/27 (2019.01)
G06F 16/22 (2019.01)
G06F 3/0484 (2022.01)

(52) U.S. Cl.
CPC ........ G06F 16/2379 (2019.01); G06F 3/0484 (2013.01); G06F 16/22 (2019.01); G06F 16/27 (2019.01)

(58) Field of Classification Search
CPC ...... G06F 16/2379; G06F 16/27; G06F 16/22; G06F 3/0484; G06N 5/02
USPC .......................................................... 707/751
See application file for complete search history.

(56) References Cited

U.S. PATENT DOCUMENTS

| 6,606,613 B1 | 8/2003 | Altschuler et al. |
| 6,691,159 B1 | 2/2004 | Grewal et al. |
| 8,516,108 B2 | 8/2013 | Shaw |
| 8,543,532 B2 | 9/2013 | Sathish et al. |

(Continued)

FOREIGN PATENT DOCUMENTS

| CN | 107464043 A | 12/2017 |
| WO | 2001027847 A1 | 4/2001 |

(Continued)

OTHER PUBLICATIONS

"International Search Report and Written Opinion Issued in PCT Application No. PCT/US19/062887", dated Feb. 12, 2020, 13 Pages.

(Continued)

Primary Examiner — Giovanna B Colan
(74) Attorney, Agent, or Firm — Schwegman Lundberg & Woessner, P.A.

(57) ABSTRACT

A method may include accessing a ratings datastore, the rating datastore including ratings for users with respect to a feature of a software application; transmitting a request for generating a content unit with respect to the feature to a first user of the users based on the first user's ratings for the feature in the ratings datastore; receiving the content unit from the first user; selecting a set of users from a first class of users to review the received content unit based on the set of users' respective ratings for the feature in the ratings datastore; storing the received content unit in a content datastore as associated with a content rating for the feature based on ratings received from the set of users.

17 Claims, 5 Drawing Sheets

(56) References Cited

U.S. PATENT DOCUMENTS

| | | |
|---|---|---|
| 8,639,552 B1 | 1/2014 | Chen et al. |
| 8,676,806 B2 | 3/2014 | Simard et al. |
| 8,719,706 B2 | 5/2014 | Harris et al. |
| 8,732,662 B1 | 5/2014 | Savant |
| 9,002,700 B2 | 4/2015 | Hoover et al. |
| 9,256,886 B2 | 2/2016 | Heer |
| 9,430,299 B2 | 8/2016 | Naveh et al. |
| 9,735,973 B2* | 8/2017 | Tabrizi .................. G06F 16/738 |
| 10,230,816 B2* | 3/2019 | Banatwala ............. H04L 51/32 |
| 2006/0059151 A1 | 3/2006 | Martinez et al. |
| 2011/0053126 A1 | 3/2011 | Bielenberg et al. |
| 2011/0238670 A1 | 9/2011 | Mercuri |
| 2011/0307408 A1 | 12/2011 | Gates |
| 2013/0204886 A1* | 8/2013 | Faith .................. G06F 16/2379 |
| | | 707/756 |
| 2013/0253969 A1 | 9/2013 | Das et al. |
| 2013/0304758 A1* | 11/2013 | Gruber .................. G06F 16/248 |
| | | 707/769 |
| 2014/0067964 A1 | 3/2014 | Grishaver et al. |
| 2014/0082072 A1 | 3/2014 | Kass et al. |
| 2014/0324757 A1* | 10/2014 | Tabrizi .................. G06F 3/0484 |
| | | 706/50 |
| 2015/0074033 A1* | 3/2015 | Shah ........................ G06N 5/02 |
| | | 706/46 |
| 2015/0154526 A1 | 6/2015 | Yates et al. |
| 2015/0186153 A1 | 7/2015 | Voronkov et al. |
| 2015/0200893 A1 | 7/2015 | Harris et al. |
| 2016/0112212 A1* | 4/2016 | Tabrizi ............... H04L 12/1822 |
| | | 715/756 |
| 2016/0179810 A1 | 6/2016 | Bolshinsky et al. |
| 2017/0205965 A1 | 7/2017 | Goel et al. |
| 2017/0308610 A1 | 10/2017 | Mullins et al. |
| 2018/0150571 A1 | 5/2018 | Douglas et al. |
| 2019/0384833 A1 | 12/2019 | Estes et al. |

FOREIGN PATENT DOCUMENTS

| | | |
|---|---|---|
| WO | 2014012138 A1 | 1/2014 |
| WO | 2017210032 A1 | 12/2017 |

OTHER PUBLICATIONS

"Non Final Office Action Issued in U.S. Appl. No. 16/009,988", dated Apr. 2, 2020, 17 Pages.

Rogstadius, et al., "Towards Real-time Emergency Response using Crowd Supported Analysis of Social Media", In Proceedings of CHI Workshop on Crowdsourcing and Human Computation, Systems, Studies and Platforms, May 7, 2011, 3 Pages.

Sethi, et al., "A Social Collaboration Argumentation System for Generating MultiFaceted Answers in Question & Answer Communities", In Proceedings of AAAI Workshop on Computational Models of Natural Argument, Aug. 7, 2011, 5 Pages.

Sethi, Ricky J., "Fact-Checking via Structured Discussions in Virtual Communities", In Proceedings of 3rd International Workshop on Social Media World Sensors, Jul. 4, 2017, 2 Pages.

U.S. Appl. No. 16/009,988, filed Jun. 15, 2018, System for Collaborative Editing based on Document Evaluation.

Allaho, et al., "Increasing the Responsiveness of Recommended Expert", In Proceedings of the 23rd ACM International Conference on Conference on Information and Knowledge Management, Nov. 3, 2014, pp. 749-758.

"International Search Report and Written Opinion Issued in PCT Application No. PCT/US2019/035915", dated Sep. 18, 2019, 13 Pages.

"Final Office Action Issued in U.S. Appl. No. 16/009,988", dated Oct. 13, 2020, 20 Pages.

"Notice of Allowance Issued in U.S. Appl. No. 16/009,988", dated Sep. 20, 2021, 11 Pages.

* cited by examiner

AUTOMATED CONTENT GENERATION

BACKGROUND

Software programs allow users to perform a variety of tasks; however, errors still often appear. When a user receives an error in a software application, the user may often search for information about how to overcome the error. The software application may include a search interface to learn more about the error and related software feature and how to correct it in some instances. For example, a spreadsheet application may indicate there is an error type related to a formula entered by the user and offer ways to correct the error.

Generally, content presented to the user related to an error or feature of an application is static because it is included in the application itself. Additionally, if a user searches for multiple errors/features the search results often include separate content for searched for errors/features due to the limitations of current help content systems.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
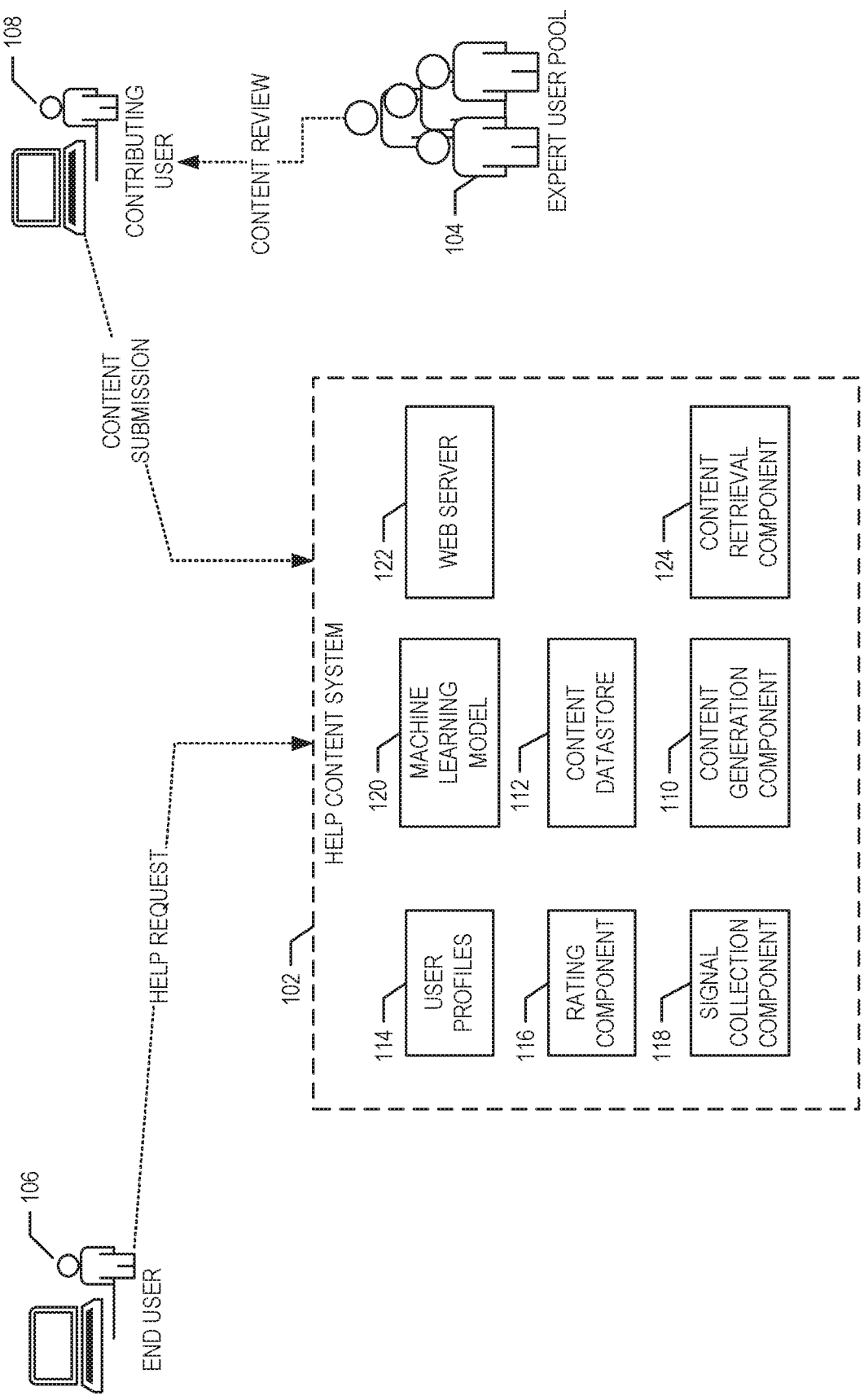
FIG. 1 illustrates an overview of a help content system, according to various examples.

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device accessible by the component via an API or other program communication method. Similarly, the variables may be assumed to have a default values should a specific value not be described. User interfaces may be provided for an end-user or administrator to edit the variable values in some instances.

In various examples, help content systems (HCS) are used to receive and present help content for software applications. Content may include text and media. (e.g., video and images). The content may also be packaged in a variety of forms such as articles, question and answer format (e.g., in forums), or short-form answers (e.g., in a chat bot) depending on the communication end-point. The use of content in a variety of formats may be referred to as multi-form content.

In some examples, the content may be presented in response to a query from a user via a help menu or clicking a user interface element to learn more about a presented error. The content may be included as part of the software application. With the prevalence of network connectivity, HCS are increasingly server based. Accordingly, although a help query may be initiated via the software application, the query may be passed to a server to obtain the actual content.

There are many problems with help content systems using multi-form content. For example, the content for a given topic is generally manually created for each form. Accordingly, there is wasted time on the part of content creators. Furthermore, more storage space is being used than is necessary given the underlying similarities in content for each form. Storage space becomes an ever-greater concern the more forms and customizations (e.g., a novice user level vs expert level) that are required.

The problem with having multiple forms for each topic becomes compounded when changes to the content for the topic are required. For example, if a better answer is discovered, or even a small update needs to be made, the change must be made for each form and for each customization. This often leads to errors in which the changes are not promulgated to each form due to the manual nature of the work.

Having multiple forms for each topic also restricts the ability of a help content system to combine content with other content because there is no source of truth for the content. Accordingly, a help content system may be unable to present a single piece of content that combines information from two separate topics.

Some previous HCS attempted to solve some of the above problems by relying on automated combinations of content. Because of the complexities involved, natural language processing solutions struggle to perform effective understanding of underlying content, and therefore many of the generated combinations are insufficient to help an end user. The result is either low quality content that requires extensive human editing or lower customer satisfaction due to the low quality (confusing or incorrect articles). This leads to either (a) a higher cost of content development due to creation of multiple content types and human review of the generated content or (b) significantly lower quality of content if this higher cost is not paid.

Described herein in various examples is a help content system that enables a write-once, present-everywhere system. The HCS improves on existing systems by (1) including the ability to dynamically re-combine content modules into short or long-form articles and (2) leveraging ranking/rating of content and expert reviews to train a machine learning model. The HCS also reduces the needed storage space for content and permits customized content depending on device (e.g., screen size) and context requirements.

The HCS introduces the concept of a content unit. A content unit may be considered the smallest amount of content needed to address a particular topic. The HCS may include an authoring tool that allows contributing users to create a content unit for a topic. Expert users may also rate the content with respect to that topic. Once realized, the content may then be rated by end users with respect to helpfulness. A content unit for one topic may be combined with a content unit for another topic, which in turn may be rated by expert and end users.

Multiple content units may be created for a single topic by different users. Different end users may see different content units. Over a period of time the low performing content units are removed. The HCS may also proactively reach out to expert users to create content units for commonly searched for topics, which may go through the same ranking process described previously.

The HCS may generate content that includes multiple content units as well as machine generated content. The generated content may go through the same ranking/rating process. The rankings/ratings of the users and content may be used as signals to train a machine learning model. The machine learning model may then be used to select more appropriate experts to request content generation from. The machine learning model may also determine which types of algorithms for machine generated content perform well and bias towards those models in the future.

FIG. 1 illustrates an overview of a help content system 102, according to various examples. Help content system 102 is illustrated with end user 106 and expert user pool 104, which includes contributing user 108. Help content system 102 is illustrated as including content generation component 110, content datastore 112, user profiles 114, rating component 116, signal collection component 118, machine learning model 120, web server 122, and content retrieval component 124.

For illustration purposes, help content system 102 is illustrated as set of separate components (e.g., topic determination component 110, signal collection component 118, etc.). However, the functionality of multiple, individual components may be performed by a single component. A component may represent computer program code that is executable by a processing unit (e.g., a core of a general-purpose computer processor, a graphical processing unit, an application specific integrated circuit, etc.) The program code may be stored on a storage device and loaded into a memory of the processing unit for execution. Portions of the program code may be executed in parallel across multiple processing units. Execution of the code may be performed on a single device or distributed across multiple devices. In some example, the program code is executed on a cloud platform (e.g., MICROSOFT AZURE® or AMAZON EC2®) using shared computing infrastructure.

A user (e.g., end user 106 and contributing user 108) may interact with help content system 102 in a variety of ways and a user have more than one role within each system. For example, a user may search for help on error the user received within an application. That same user may also contribute content to help content system 102 with topics the user is an expert in. Throughout this disclosure, a user may be referred to with a modifier indicating the role the user is currently acting as.

For example, an expert user may be a user that has a rating above a threshold for a feature of an application. A user may be considered an expert user for some features and not others. A contributing user may be a user that writes content. A reviewing user may be an expert user that is reviewing content submitted by a contributing user or machine generated combinations of content. An end user may be a user that is requesting content. An administrator user may edit back-end scoring formulas, machine learning algorithms, workflow rules, etc.

A user may be represented in help content system 102 as a user profile data structure stored within user profiles 114. User profiles 114 may be part of larger data store or exist as a standalone datastore. The user profile data structure may include additional data structures. For example, the user profile data structure may include a one or more rating data structures that identifies ranking scores for the user's different roles and application features. Ratings are discussed in more detail with respect to rating component 116 and FIG. 2, Some end users may not have user profiles because they are searching help content system 102 via a web browser e.g., they may be anonymous.

The user profile data structure may include a user identification for the user. Each user identification may be unique. The user identification may be comprised of alphanumeric characters. The user identification is an e-mail address, in an example. The user identification may be shared across the roles of the user. The user identification may be used across multiple applications in an application suite and may be the same identification used as a login to submit or review content.

The user profile data structure may include entries associated with external sources of information associated with the user. An entry may include credentials (e.g., user id, tokens, etc.) and a logical access location (e.g., website/API URL) for the external source of information. Periodically (e.g., daily), signal collection component 118 may retrieve data from the external sources as described further herein below to calculate a rating. A user profile data structure may identify user characteristics with respect to a user. Characteristics may include, but are not limited to, demographics (age, etc.), application proficiencies (e.g., novice user of spreadsheet application XYZ) based on rating data structures, feature/task level proficiencies in an application, education level, and current and past jobs.

The user profile data structure may be established through a combination of manual and automated entry. As indicated above, a user's identification may persist across multiple systems. Thus, multiple systems may access and alter data in the user profile data structure. For example, help content system 102 may provide a user interface (e.g., web, mobile, in-application, etc.) in which the user may view the data stored in their user profile data structure and edit the structure. In another example, an administrator user may access the user profile to add/edit details to a user's profile data structure.

End user 106, contributing user 108, and users in expert user pool 104 may use client devices to communicate with help content system 102. The client devices may comprise, but are not limited to, a smartphone, tablet, laptop, multi-processor system, microprocessor-based or programmable consumer electronics, game console, set-top box, or any other device that a user utilizes to communicate over a network. In example embodiments, the client devices comprise a display module (not shown) to display information (e.g., in the form of specially configured user interfaces). In some embodiments, the client devices comprise one or more of a touch screen, camera, keyboard, microphone, and Global Positioning System (GPS) device.

The client devices may communicate with help content system 102 over a network (not shown). A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. A network may include a single local area network (LAN) or wide-area network (WAN), or combinations of LAN's or WAN's, such as the Internet.

The client devices may interact with help content system 102 based on communications with web server 122 over the network. Although generally discussed in the context of delivering webpages via the Hypertext Transfer Protocol (HTTP), other network protocols may be utilized by web server 122 (e.g., File Transfer Protocol, Telnet, Secure Shell, etc.) A user may enter in a uniform resource identifier (URI) into a network browser (e.g., the INTERNET EXPLORER® web browser by Microsoft Corporation or SAFARI® web browser by Apple Inc.) that corresponds to the logical location e an Internet Protocol address) of web server 122. In response, web server 122 may transmit a web page that is rendered on a display device of user device (e.g., a mobile phone, desktop computer, etc.).

A web server may enable a user to interact with one or more web applications provided in a transmitted web page. A web application may provide user interface (UI) components that are rendered on a display device of a computing device. The user may interact (e.g., select, move, enter text into) with the UI components, and, based on the interaction, the web application may update one or more portions of the web page. A web application may be executed in whole, or in part, locally on a client device. The web applications may enable content authoring by authoring users via content generation component 110 and presenting content via content retrieval component 124. The web application may populate the UI components with data from external sources or web server in various examples. The web application may issue API calls to retrieve the data. Conversely, data entered by a user into a UI component may be transmitted using an API call back to the web server.

Content datastore 112 may be a database in some examples. The specific storage layout and model used in the database may take a number of forms indeed, a database may utilize multiple models. The database may be, but is not limited to, a relational database (e.g., SQL), non-relational database (NoSQL) a flat file database, object model, document details model, graph database, shared ledger (e.g., blockchain), or a file system hierarchy. The database may store data on one or more storage devices (e.g., a hard disk, random access memory (RAM), etc.). The storage devices may be in standalone arrays, part of one or more servers, and may be located in one or more geographic areas.

Content datastore 112 may store a set of content units. Each content unit may be stored as associated with (e.g., identified in a table row of the content unit) a topic. A topic may be a feature of an application or error related to a feature in an application, a question by an end user, among other topics. The topic may also be associated with an original contributing user and reviewing users. There may be multiple content units for each topic. A content unit may also be associated with a set of collected signals by signal collection component 118 (e.g., by presenting a rating scale to a user via web server 122). The signals may include a set of ratings for the content unit such as a helpfulness rating (e.g., as indicated by end users) and an expert rating (e.g., as reviewed by expert users). Content datastore 112 may also include generated content that may include combinations of content units. The generated content may include a similar set of ratings as a content unit.

Content generation component 110 may use a set of logic rules or output from machine learning model 120 to solicit content from expert users. Experts users may be asked to provide content units for top issues in their area of expertise (e.g., the top five based on ratings in their user profiles). Compensation for this work may be adjusted based on the expert's value—the experts rating for a topic compared to other experts—as well as the ratings/rankings given to the specific piece of created content. In various examples, help content system 102 continually tests newly produced content against the performance of the top ranked content units for a given question or topic (discussed in greater detail below). The results of these ratings may determine the top content.

Content generation component 110 may also, without human input, generate combinations of content units for top intents. An intent may be a common question or error related to an application feature. In some examples, an intent will involve more than one application feature. Therefore, content generation component 110 may combine the content units of the individual features into a single generated content article. Signal collection component 118 may query a metrics database that includes error rates and search histories to determine the top intents. The generated content may be published (e.g., made available on a network) in various examples.

The generated content may include variations. The variations may include using different phrasing, formatting, ordering of content units, etc. Based on the performance (e.g., helpfulness rating, expert ratings) of the variants, future generated content may be improved. For examples, signal collection component 118 may train machine learning model 120 (e.g., a Bayesian network, neural network, etc.) using the ratings. Accordingly, machine learning model 120 may be able to predict the helpfulness rating and expert rating for a variant and if the variant does not meet a predicted threshold rating it may not be published. The machine learning model 120 may also use the end points and experience level of an end user as inputs.

In various examples, there may be customized generated content based on a user type (e.g., novice or expert users) that may be targeted to those users. The user type may be stored as part of a user profile. For example, more advanced topics may be generated for advanced users vs a simpler topic for novice users. Help content system 102 may store a rating (e.g., 1-5) for each topic with respect to its difficultly (e.g., 5 being advanced) in order to filter out advanced topics for novice users.

Figure 2:
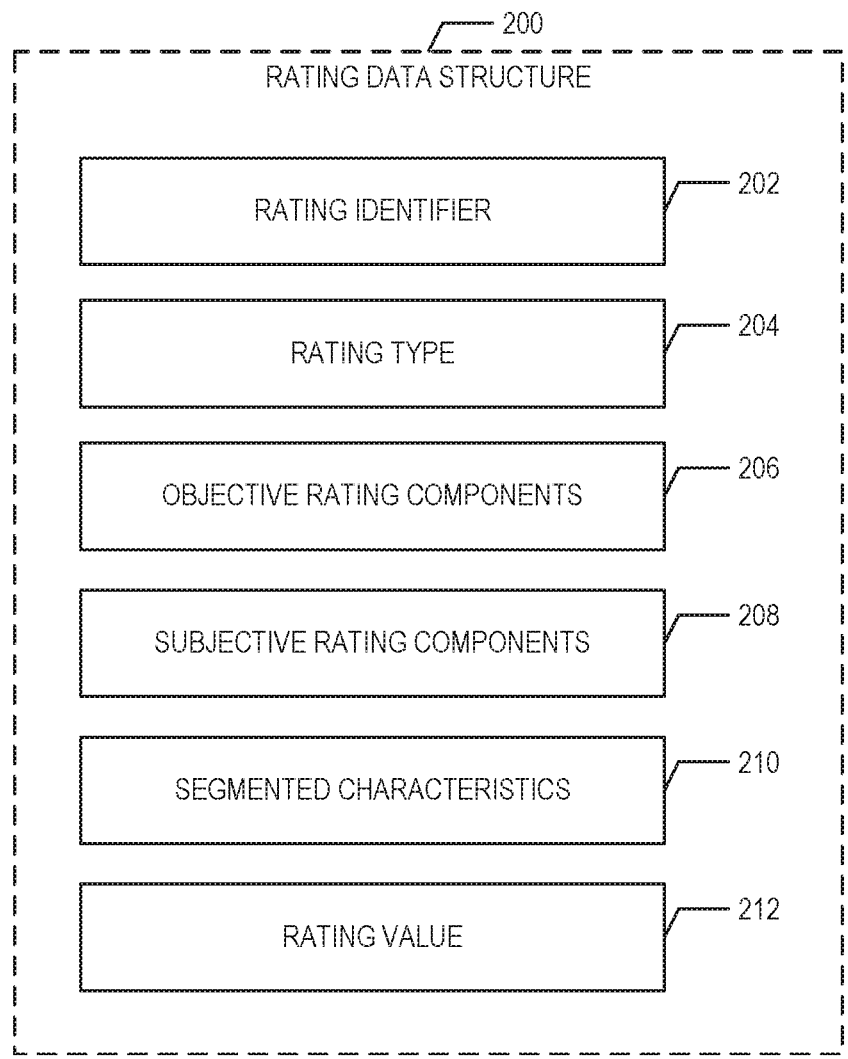
FIG. 2 illustrates a rating data structure 200, according to various examples.

FIG. 2 illustrates a rating data structure 200, according to various examples. FIG. 2 includes rating identifier 202, rating type 204, objecting rating components 206, subjective rating components 208, segmented characteristics 210, and rating 212.

The underlying structure of rating data structure 200 may conform to a standardized format. For example, an XML Schema Definition (XSD) file may be used to indicate the various illustrated portions of rating data structure 200 as described above. When a new rating data structure is created, the rating data structure may be stored as an XML document conforming to the XSD file. Other file formats may be used without departing from the scope of this disclosure.

Rating data structure 200 is illustrated as a generic rating data structure that may be used for multiple types of ratings. More specific rating data structures may also be used. For example, there be separate application proficiency and content editor rating data structures. In such cases, rating type 204 may not be needed.

Rating data structures may be managed created, deleted, updated, etc. using a rating management UI. The rating management UI may be served as a web interface or standalone application, in various examples. The rating management UI may be hosted within or be communicatively coupled to help content system 102. Access to the rating management UI may be managed according to authorized personnel. The rating management UI may present a set of input UI elements to define a rating data structure. In some examples, the UI inputs correspond to fields in rating data structure 200.

Rating identifier 202 may indicate the name of the rating. The name be a function of rating type 204. For example, rating types may be for application feature proficiencies, overall application proficiency, document intent experience, ratings from other users, time to complete a task, among others. Accordingly, rating identifier 202 may be "pivot tables" and rating type 204 may be "feature proficiency."

Ratings may be objective in that the measurement originates from a trusted third-party or is quantitative in nature. In contrast, subjective rating components 208 may originate from other users and be qualitative in nature. If the rating originates from a user even if the rating is a number as opposed to measured application data, etc., the rating may be considered subjective.

Objective rating components 206 may include measurements of data related to the type of rating. For example, if rating type 204 is for application feature proficiencies, objective rating components 206 may include the number of times a feature has been used, the frequency the feature has been used, certification from third parties related to the feature, job history, education level, obtained degrees, closeness to meeting an estimated budget, among other things.

Subjective rating components 208 may include ratings given by human users related to the type of rating. For example, there may be a quality rating of an content unit attributable to a user. In such an instance, rating identifier 202 may include the name of the support page or a name of feature of an application that the content unit is for. Another subjective rating may be an overall rating for an expert user with respect to how helpful the expert user was in assisting an end user with a task. For example, after completing a document, the end user may be given the opportunity to rate how helpful the expert user was (e.g., a 1-5 rating). Similarly, the expert user may give a rating to the end user which may indicate the end users familiarity with a feature.

Segmented characteristics 210 may be used for more granular ratings. A segmented characteristic may be a rating type. For example, a user may have a helpfulness rating for users with high proficiency in application and a different helpfulness rating for users with a low proficiency in the application. As another example, a user may have different helpfulness ratings based on an age of the end user requesting help.

Rating value 212 may include a value representing rating identifier 202 for rating type 204 and segmented characteristics 210, if applicable. The value may be quantitative or qualitative in nature. Rating 212 may be calculated based on the values included in objecting rating components 206 and subjective rating components 208 for a particular rating. For example, a weighting formula may be used for the various components such as (0.2)(objective rating 1)+(0.3)(objective rating 2)+(0.5)(subjective rating 1). The formula and weights may be stored with within rating data structure 200 and may editable by an administrator user. In various examples, rating value 212 is calculated by rating component 116.

Signal collection component 118 may be used to obtain data for objecting rating components 206 and subjective rating components 208. The signals may come from within help content system 102 or applications associated with help content system 102 as well as external sources. External sources may include, but are not limited to, personal or professional social networks, accreditation services, third party data aggregators, etc.

An external source may be accessed using a variety of means. For example, an external source may provide an API that enables help content system 102 to specify a user identification. In response to the API call, the external source may format a response data package with data associated with the user identification. The information may include proficiency ratings for applications, application features, profession data such as current job title, and the like. The information may be stored as user characteristics or ratings within a user profile.

In another example, help content system 102 may access the external source using user provided credentials (e.g., as stored in a user profile data structure) to act as the user. Then, help content system 102 may use screen scraping techniques, as are known in the art, to retrieve information such as technical proficiency ratings, from the external source.

Data retrieved from an external source may be transformed to a format consistent with an ontology used by help content system 102. For example, a professional social network may have skills a user can enter into the user's profile. A data map as stored in help content system 102 may identify a mapping between the skills of the social network and user characteristics of a user profile data structure. Accordingly, when retrieving data from the social network, the map be queried to obtain the ontology terminology (e.g., a feature rating or application proficiency) for the skill. The mapping may also identify a scale to use (e.g., 20% to a 2 rating).

Accordingly, using a combination of signal collection component 118, rating component 116, content datastore 112, user profiles 114, and rating data structures such as depicted in FIG. 2, a variety of ratings may be determined and maintained. These ratings may be used to trigger a variety of processes within help content system 102. For example, at least the following rating type may be stored: expert ratings, content unit ratings, and generated content ratings.

Expert ratings for a given application feature may be used to determine the expert's ranking within a group of experts for the feature and therefore may influence when the expert is solicited for content. For example, for an important topic (e.g., a top ten searched for feature), help content system 102 may only solicit content from the top experts (e.g., top 25%) according to the ranking. For a less important topic, help content system 102 may solicit content from the top half of experts according to the ranking. The ranking may also be used to determine which experts are used to review content from other experts or the system generated content.

Content units may have ratings based on a number of weighted factors. The factors may include ratings given by other experts and end users. A rating from an expert with a high ranking (e.g., top 10%) may be weighted more than a low ranking (e.g., bottom 10%) expert. In an example weighting, the expert ratings are collective 25% of the overall rating and the end user's ratings are collectively the other 75%. When a content unit is given a low rating (e.g., less than two in a five-point scale), the rating of the expert with respect to that feature (and associated application) may be lowered. Conversely, if the content unit is given a high rating (e.g., four or more in a five-point scale), the rating of the expert may be increased.

Figure 3:
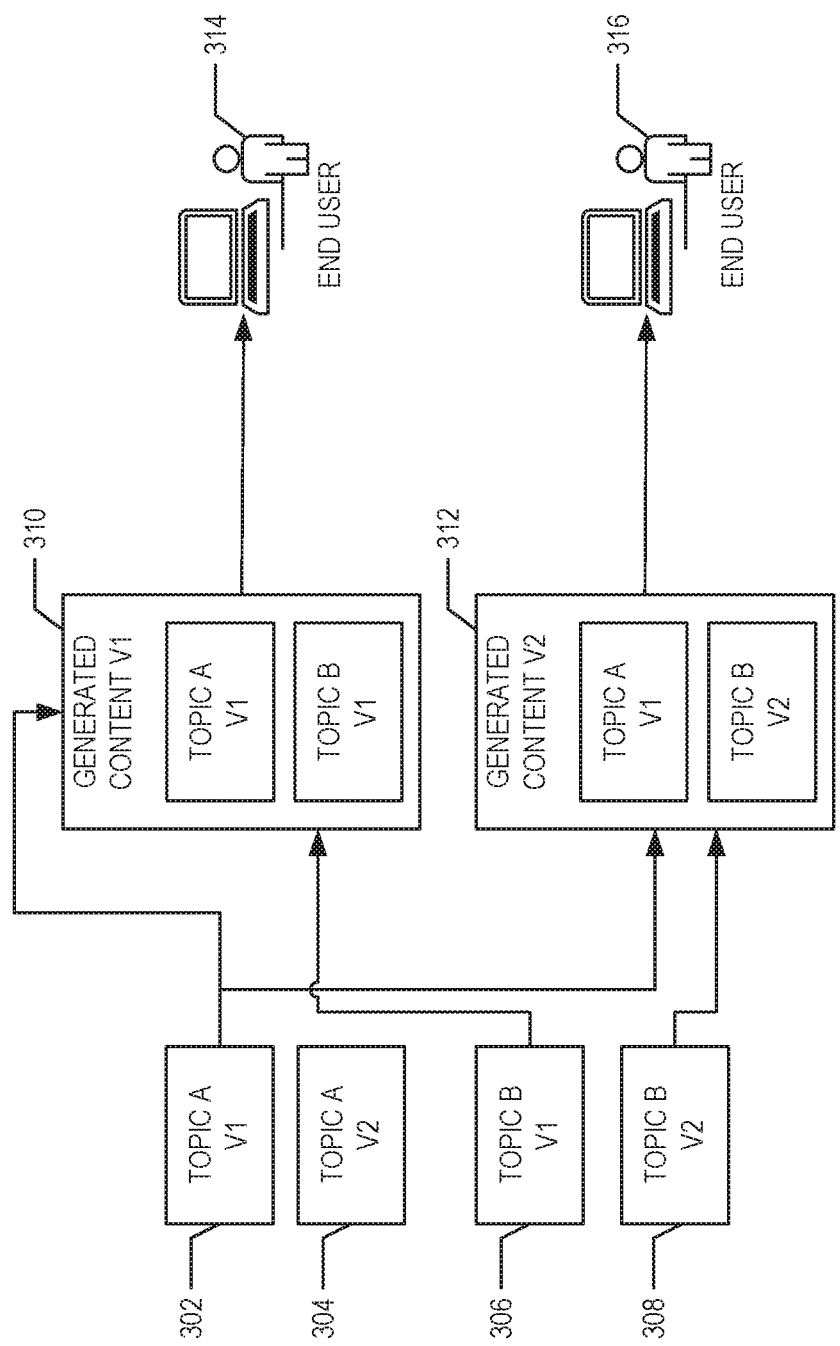
FIG. 3 is diagram illustrating serving generated content to end users, according to various examples

FIG. 3 is diagram illustrating serving generated content to end users, according to various examples. FIG. 3 includes content units 302, 304, 306, 308, generated content 310, 312 and end users 314, 316. Content units 302 and 304 may be content units related to Topic A that have been contributed by two different expert users. Content units 306 and 308 may be content units related to Topic B that have been contributed by two different expert users.

As discussed previously, help content system 102 may periodically (e.g., weekly) generate content for top intents. In the illustrated case, there may be an intent that involves both topic A and B. Accordingly, help content system 102 may generate combinations of content units for topics A and B. FIG. 3 illustrates two combinations, but the system is not so limited. Content unit 304 may not be selected because its rating may below a threshold level.

To determine which of the generated contents 310, 312 is best, help content system 102 may publish/distribute both versions. In various examples, help content system 102 may present generated content 310 to 80% of end users that search for the intent and present generated content 312 to 20% of end users. The split may be based on the ratings of the experts that have submitted the constitute content units. For example, consider that the expert that contributed content unit 306 for topic B is rated higher than the expert that contributed content unit 308 for topic B. Help content system 102 may also use other factors in determining the split such as the rating of the individual content units.

Figure 4:
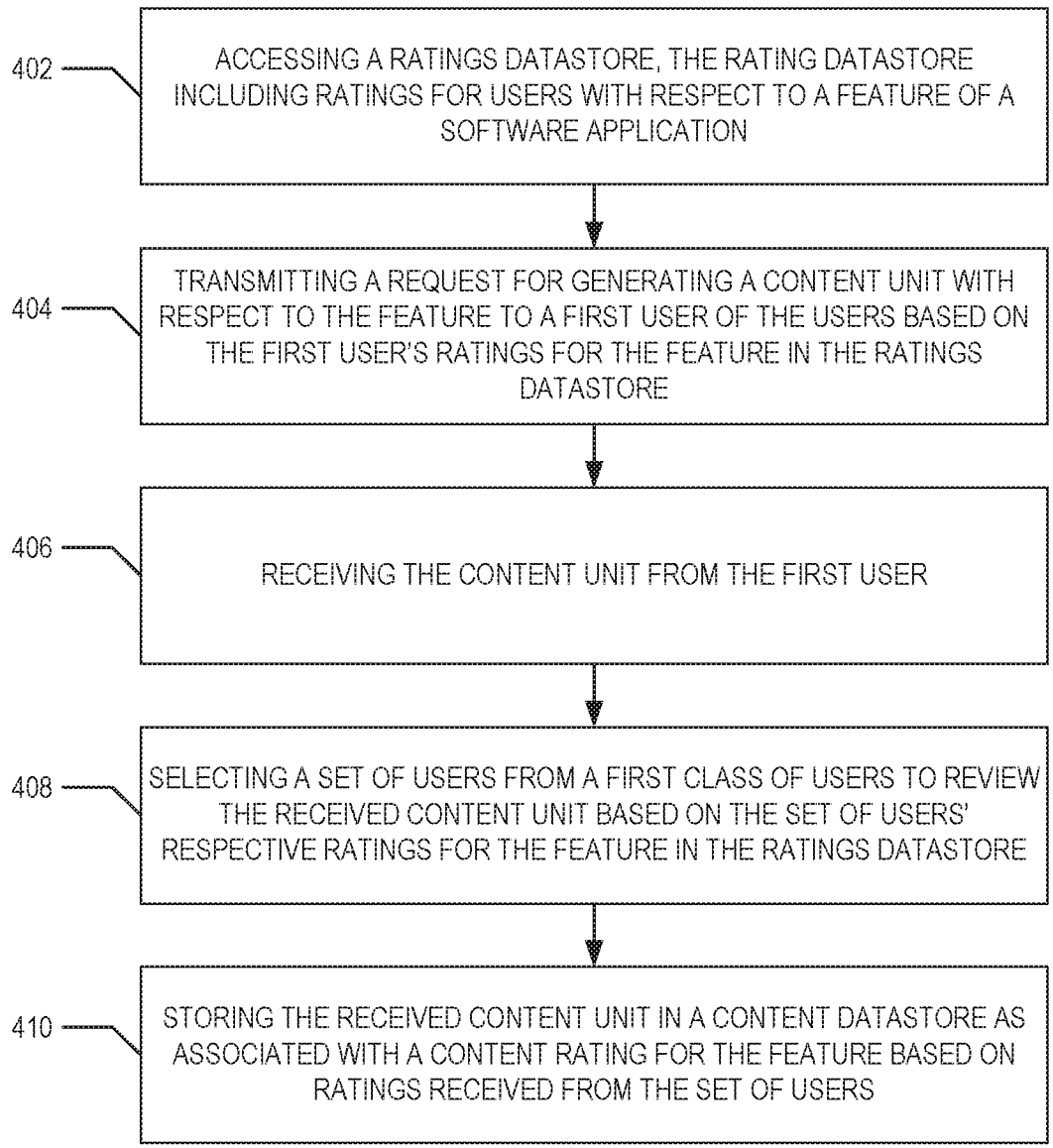
FIG. 4 is a flowchart representation of a method to manage generating content units, according to various examples

FIG. 4 is a flowchart representation of a method to manage generating content units, according to various examples. The method may be embodied in a set of instructions stored in at least one computer-readable storage device of a computing device(s). The computing device(s) may have one or more processors that execute the set of instructions to configure the one or more processors to perform the operations illustrated in FIG. 4. A computer-readable storage device excludes transitory signals. In contrast, a signal-bearing medium may include such transitory signals. To this end, the one or more processors may instruct other parts of the computing device to carry out the set of instructions. For example, the computing device may instruct a network device to transmit data to another computing device or the computing device may provide data over a display interface to present a user interface. In some examples, performance of the method may be split across multiple computing devices At block 402, in various examples, an operation of accessing a ratings datastore, the rating datastore including ratings for users with respect to a feature of a software application may be performed. The ratings datastore may be part of a larger datastore combined with other datastores such as a content datastore (e.g., content datastore 112). The operation at block 402 and subsequent blocks may be performed by the components described above with respect to help content system 102 in FIG. 1. The ratings may be stored as a part of ratings data structure contained with a user profile of the users.

At block 404, an operation of transmitting a request for generating a content unit with respect to the feature to a first user of the users based on the first user's ratings for the feature in the ratings datastore may be performed. The request may be an electronic request sent through a web application, a push notification, an electronic message, among other mechanisms, to a client device associated with the first user.

As a recurring example within the context of FIG. 4 consider the following scenario. Help content system 102 may determine that the first user, Jack, is a top spreadsheet application expert based on his usage of the application, social media profiles and forum posts. Based on this rating, Jack may be invited by the transmission to create a content unit to answer one of the top spreadsheets questions how to fix the #Value error. Given Jack's high ranking and the importance of the content a substantial reward (in this case a monetary payment) may be offered for this work.

At operation 406, in various examples, receiving the content unit from the first user may be performed. An interface may be presented on the client device of Jack to enter in text and pictures for the software feature (e.g., the #Value error).

Continuing the example, help content system 102 may recognize that the #Value error is being searched for across a variety of end points (e.g., user communication channels). These end points may include queries within the application, web searches, and forum posts. Based on this the system (e.g., content generation component 110) may generate a plurality of versions of the received content unit for different communication channels. In some examples, a version may include altering formatting. (larger, smaller fonts), removing pictures, etc., depending on channel requirements and capabilities. In some examples, a version maintains the same textual content but is saved in different datastore accessible to the channel. Any changes made to the underlying content unit may be automatically promulgated to the different versions in various examples.

In various examples, generating may include combining Jack's answer with other relevant information (e.g. when a user searches for #Value error for the NETWORKDAYS function, information from Jack's #Value error and information from another experts NETWORKDAYS function content unit is automatically combined for the final generated content). Accordingly, the system may automatically generate content that combines the content unit received from the first user at operation 402 with a content unit associated with another feature of the software application in various examples.

Generating may also include creating different versions depending on user experience levels. For example, an advanced version of the content may include links to other content (e.g., software features) users often use with NETWORKDAYS whereas for novice users the links may be filtered out. To determine what information to filter out multiple variations of the content may be automatically generated and transmitted to different sets of end users. The ratings for each of the variations may be used to train machine learning model 120, which in turn may output which links are more or less likely to cause a lower rating from end users.

At operation 408, in various examples, an operation of selecting a set of users from a first class of users to review the received content unit based on the set of users' respective ratings for the feature in the ratings datastore may be performed. The first class of users may be an expert class of users that have a rating above a threshold with respect to the application feature of the content unit. This set of users may also be used to review and rate the generated content.

Continuing the example, both the content unit and generated content are sent to a number of spreadsheet application experts (based on the experts' ratings in their user profiles) to rate to review the content. As Jack's content unit performs well (e.g., is highly rated by the experts) it may promoted to being the top answer for #Value and is used in the generation of all #Value related content.

Machine learning model 120 may be trained by the ratings received from experts and increases the rank of models which produce the highest rated generated content for each end-point. For example, content generation component 110 may include a number of content generation models. Each model may try different editing (e.g., formatting, transitional work phrasing, etc.) and combination techniques (e.g., ordering) for each end point, Models may also use different types of natural language processing or machine learning algorithms. Thus, over a period of time, one model may perform better for a forum end point and another model may perform better for the in-application support pages. Going forward, the better performing models for each end points may be used the majority of the time. The final content that may be sent to end users may include elements of the original content unit, elements of the machine generated content, and elements of edits provided by spreadsheet expert reviewers (e.g., variants with and without different expert edits may be tested).

At block 410, in various examples, an operation of storing the received content unit in a content datastore as associated with a content rating for the feature based on ratings received from the set of users may be performed. The rating may be based on a weighted average of ratings received from the set of users. For example, the higher the user's own expert rating, the more weight that user's rating may be given.

After the content unit is stored it may be released to the various end points for further review. Similarly, any generated content may be released for further review/ratings. For example, ratings for the content unit (or generated content) from a set of users of a second class of users, the first class being different than the second class may be received. The second class of users may be end users that rate the helpfulness of the content unit. The content rating for the content unit may be updated based on the ratings received from the set of users of the second class. For example, a weighted averaged between the ratings from the first class of user and second class of users may be used. In some examples, the first user's ratings for the feature in the ratings datastore may be updated based on the content rating for the content unit. For example, content rating goes below a threshold, the first user's rating may also be lowered by a set amount or a percentage decrease.

As indicated previously, help content system 102 may continuously be trying to find the best content. Accordingly, help content system 102 may transmit a request to a second user for content for the same software feature. The second user may write a content unit for the software feature, which may be stored in the content datastore. Help content system 102 may access the content unit received with a second user for the feature of the software application. Help content system 102 may calculate a distribution percentage between the content unit received from the first user and the content unit received from the second user based on the first user's ratings for the feature and a rating for the feature of second user. The distribution percentage may be the relative amount of time end users see the content. For example, if the first user has a higher expertise rating than the second user, the distribution may be 80/20 towards the first user. Different distribution algorithms may be used without departing from the scope of this disclosure.

Then, once distributed, ratings may be received for the content unit received from the second user from a set of users of a second class of users. The content rating for the content unit received from the second user may be updated based on the ratings received from the set of users of the second class for the content unit received from the second user. Then, the distribution percentage may be automatically changed based on the updated content rating for the content unit received from the first user and the updated content rating for the content unit received from the second user. For example, if the content rating for the content unit from the second user outperforms (e.g., has a higher rating over a period of time), the first's users version, the distribution may change to 80/20 in favor of the second user.

Returning now to the example with Jack, help content system 102 may determine that Jill is a rising spreadsheet application formula expert based on her usage of the application and posts on a forum. Based on this help content system 102 invites Jill to create a content unit to answer a variety of spreadsheet questions—including the #Value error. Jill formulates an answer and submits it to help content system 102. Jill's answer goes through the same expert review, and generation system that Jack's answer went through.

Jack's answer is rated as the best answer and is therefore offered to most users. Help content system 102 may take a random sampling of users viewing Jack's answer and compares it to the performance of Jill's answer against a statistically equivalent sampling. Through this process help content system 102 determines that Jill's answer is performing better than Jack's.

Help content system 102 now takes this information to (a) increase Jill's ranking within the system (b) mark Jill's answer as the top performing answer (which is now shown to the majority of users) (c) demotes Jack answer and ranking (d) start comparing other expert answers for this topic against Jill's. This effectively creates a self-monitoring and self-generating system for high quality content that improves over time.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
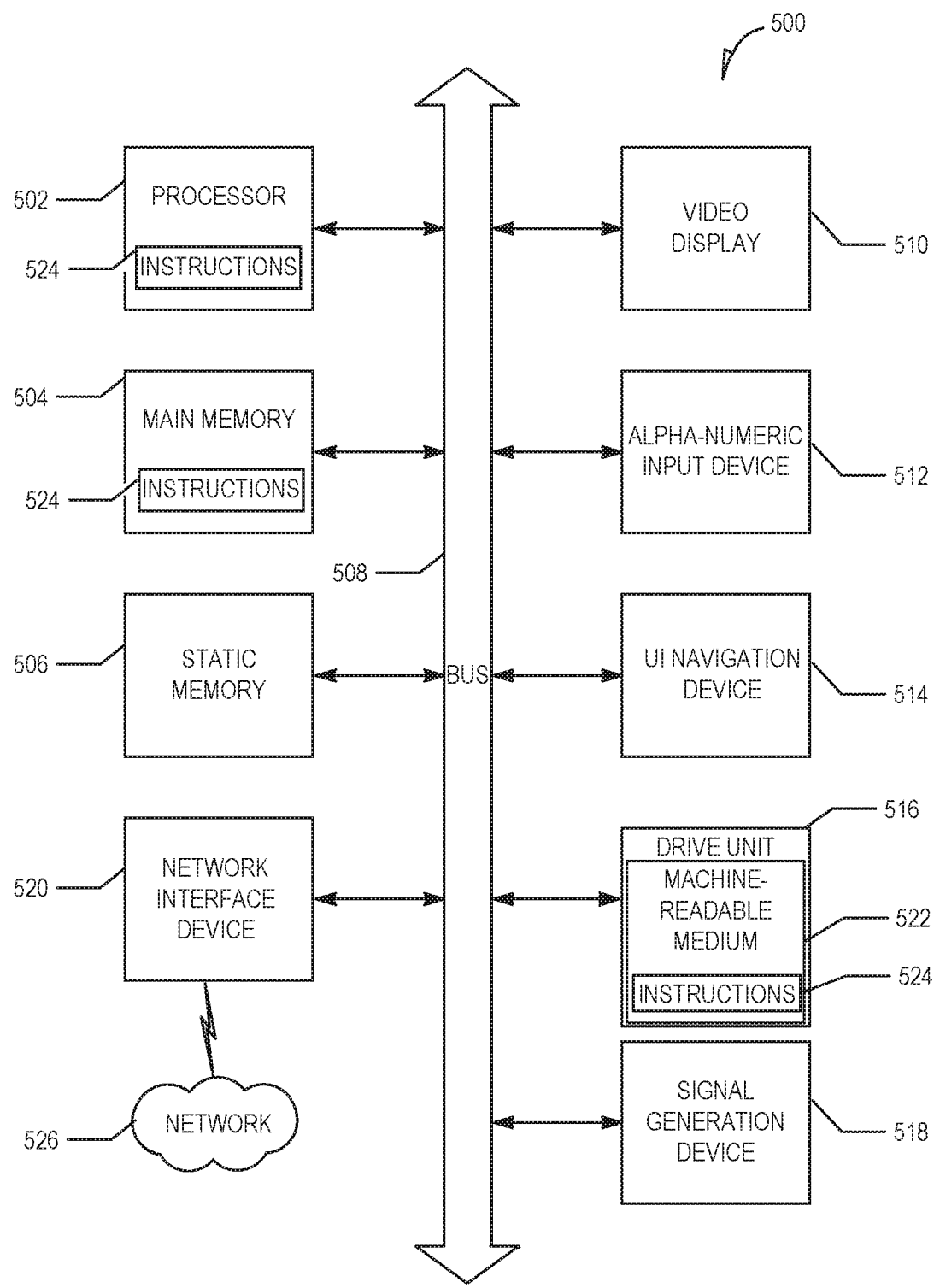
FIG. 5 is a block diagram illustrating an example machine upon which any one or more of the techniques (e.g., methodologies) discussed herein may be performed, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, 4G LTE/LTE-A or WiMAX networks, 5G). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples one or more aspects thereof) shown or described herein.

What is claimed is:
1. A system comprising:
   at least one processor;
   a storage device comprising instructions, which when executed by the at least one processor, configure the at least one processor to perform operations comprising:
      detecting a request for generating a content unit with respect to a feature of a software application;
      accessing a ratings datastore, the rating datastore including ratings of users regarding user expertise with respect to the feature of the software application;

selecting a first user for generating the content unit based on the ratings of the users with respect to the feature;

transmitting the request for generating the content unit to the first user;

receiving the generated content unit from the first user;

selecting a set of users from a first class of users to review the generated content unit based on the ratings of the set of users with respect to the feature in the ratings datastore;

calculating a content rating for the generated content unit based on ratings for the content received from one or more of the selected set of users;

storing the generated content unit in a content datastore as associated with the calculated content rating for the feature;

accessing a content unit generated by a second user for the feature of the software application; and calculating a distribution percentage between the content unit generated by the first user and the content unit generated by the second user based on the rating for the feature for the first user and a rating for the feature for the second user.

2. The system of claim 1, wherein the instructions, when executed by the at least one processor, further configure the at least one processor to perform:

generating, without user input, a plurality of versions of the generated content unit for different communication channels.

3. The system of claim 1, wherein the instructions, when executed by the at least one processor, further configure the at least one processor to perform:

receiving ratings for the content unit from a set of users of a second class of users, the first class being different than the second class; and updating the content rating for the content unit based on the ratings received from the set of users of the second class.

4. The system of claim 3, wherein the instructions, when executed by the at least one processor, further configure the at least one processor to perform:

updating the first user's ratings for the feature in the ratings datastore based on the content rating for the content unit.

5. The system of claim 1, wherein the instructions, when executed by the at least one processor, further configure the at least one processor to perform:

receiving ratings for the content unit received from the second user from a set of users of a second class of users;

updating a content rating for the content unit received from the second user based on the ratings received from the set of users of the second class for the content unit received from the second user; and automatically changing the distribution percentage based on the updated content rating for the content unit received from the first user and the updated content rating for the content unit received from the second user.

6. The system of claim 1, wherein the instructions, when executed by the at least one processor, further configure the at least one processor to perform:

automatically generating content that combines the content unit received from the first user with a content unit associated with another feature of the software application;

receiving ratings for the generated content from a set of users of the first class;

receiving ratings for the generated content from a set of users of a second class; and determining a content rating for the generated content based on the ratings received for the received content from the set of users of the first class and the set of users of the second class.

7. A method comprising:

detecting a request for generating a content unit with respect to a feature of a software application;

accessing a ratings datastore, the rating datastore including ratings of users regarding user expertise with respect to the feature of the software application;

selecting a first user for generating the content unit based on the ratings of the users with respect to the feature;

transmitting the request for generating the content unit to the first user;

receiving the generated content unit from the first user;

selecting a set of users from a first class of users to review the generated content unit based on the ratings of the set of users with respect to the feature in the ratings datastore;

calculating a content rating for the generated content unit based on ratings for the content received from one or more of the selected set of users;

storing the generated content unit in a content datastore as associated with the calculated content rating for the feature;

accessing a content unit generated by a second user for the feature of the software application; and calculating a distribution percentage between the content unit generated by the first user and the content unit generated by the second user based on the rating for the feature for the first user and a rating for the feature for the second user.

8. The method of claim 7, further comprising:

generating, without user input, a plurality of versions of the generated content unit for different communication channels.

9. The method of claim 7, further comprising:

receiving ratings for the content unit from a set of users of a second class of users, the first class being different than the second class; and updating the content rating for the content unit based on the ratings received from the set of users of the second class.

10. The method of claim 9, further comprising:

updating the first user's ratings for the feature in the ratings datastore based on the content rating for the content unit.

11. The method of claim 7, further comprising:

receiving ratings for the content unit received from the second user from a set of users of a second class of users;

updating a content rating for the content unit received from the second user based on the ratings received from the set of users of the second class for the content unit received from the second user; and automatically changing the distribution percentage based on the updated content rating for the content unit received from the first user and the updated content rating for the content unit received from the second user.

12. The method of claim 7, further comprising:
automatically generating content that combines the content unit received from the first user with a content unit associated with another feature of the software application;
receiving ratings for the generated content from a set of users of the first class;
receiving ratings for the generated content from a set of users of a second class; and
determining a content rating for the generated content based on the ratings received for the received content from the set of users of the first class and the set of users of the second class.

13. A storage device comprising instructions, which when executed by at least one processor, configure the at least one processor to perform operations comprising:
detecting a request for generating a content unit with respect to a feature of a software application;
accessing a ratings datastore, the rating datastore including ratings of users regarding user expertise with respect to the feature of the software application;
selecting a first user for generating the content unit based on the ratings of the users with respect to the feature;
transmitting the request for generating the content unit to the first user;
receiving the generated content unit from the first user;
selecting a set of users from a first class of users to review the generated content unit based on the ratings of the set of users with respect to the feature in the ratings datastore;
calculating a content rating for the generated content unit based on ratings for the content received from one or more of the selected set of users;
storing the generated content unit in a content datastore as associated with the calculated content rating for the feature;
accessing a content unit generated by a second user for the feature of the software application; and
calculating a distribution percentage between the content unit generated by the first user and the content unit generated by the second user based on the rating for the feature for the first user and a rating for the feature for the second user.

14. The storage device of claim 13, wherein the instructions, when executed by the at least one processor, further configure the at least one processor to perform:
generating, without user input, a plurality of versions of the generated content unit for different communication channels.

15. The storage device of claim 13, wherein the instructions, when executed by the at least one processor, further configure the at least one processor to perform:
receiving ratings for the content unit from a set of users of a second class of users, the first class being different than the second class; and
updating the content rating for the content unit based on the ratings received from the set of users of the second class.

16. The storage device of claim 13, wherein the instructions, when executed by the at least one processor, further configure the at least one processor to perform:
updating the first user's ratings for the feature in the ratings datastore based on the content rating for the content unit.

17. The storage device of claim 15, wherein the instructions, when executed by the at least one processor, further configure the at least one processor to perform:
receiving ratings for the content unit received from the second user from a set of users of a second class of users;
updating a content rating for the content unit received from the second user based on the ratings received from the set of users of the second class for the content unit received from the second user; and
automatically changing the distribution percentage based on the updated content rating for the content unit received from the first user and the updated content rating for the content unit received from the second user.

* * * * *